United States Patent
Kutsenko et al.

(10) Patent No.: US 8,410,041 B2
(45) Date of Patent: Apr. 2, 2013

(54) ADVANCED MOISTURE MANAGEMENT LAUNDRY ADDITIVE FOR PROVIDING SOFT HAND, MOISTURE TRANSPORT AND ANTISTATIC PROTECTION FOR POLYESTER, POLYESTER/SPANDEX POLYESTER/COTTON AND COTTON FABRICS

(75) Inventors: Mikhail Kutsenko, Monroe, NC (US); Christopher Hagler, Monroe, NC (US); Thomas Theyson, Monroe, NC (US); Darren Mond, Monroe, NC (US)

(73) Assignee: Goulston Technologies, Inc., Monroe, NC (US)

( * ) Notice: Subject to any disclaimer, the term of this patent is extended or adjusted under 35 U.S.C. 154(b) by 331 days.

(21) Appl. No.: 12/686,180

(22) Filed: Jan. 12, 2010

(65) Prior Publication Data
US 2010/0175201 A1 Jul. 15, 2010

Related U.S. Application Data

(60) Provisional application No. 61/143,902, filed on Jan. 12, 2009.

(51) Int. Cl.
*C11D 3/50* (2006.01)
(52) U.S. Cl. ........................ 510/475; 528/271
(58) Field of Classification Search .......... 528/271; 510/475
See application file for complete search history.

(56) References Cited

U.S. PATENT DOCUMENTS

| | | | |
|---|---|---|---|
| 3,483,169 A * | 12/1969 | Kaiser et al. ............... 527/311 |
| 3,728,151 A * | 4/1973 | Sherman et al. ............ 442/80 |
| 4,535,127 A * | 8/1985 | Matsuzaki et al. .......... 525/154 |
| 5,281,630 A * | 1/1994 | Salsman ..................... 521/48.5 |
| 5,627,000 A * | 5/1997 | Yamazaki et al. ........ 430/124.37 |
| 7,056,877 B2 | 6/2006 | Caswell et al. |
| 7,091,171 B2 | 8/2006 | Caswell et al. |
| 7,112,621 B2 | 9/2006 | Rohrbaugh et al. |
| 7,166,565 B2 | 1/2007 | Caswell et al. |
| 7,186,680 B2 | 3/2007 | Caswell et al. |
| 7,196,048 B2 | 3/2007 | Zhang et al. |
| 7,351,683 B2 | 4/2008 | Del Duca et al. |
| 7,402,555 B2 | 7/2008 | Moore et al. |
| 2008/0241716 A1* | 10/2008 | Ishikawa et al. .............. 430/48 |

* cited by examiner

*Primary Examiner* — John Hardee
(74) *Attorney, Agent, or Firm* — Sughrue Mion, PLLC

(57) ABSTRACT

The present invention relates to a composition that, when incorporated into various steps of household and/or commercial laundering cycles provides highly durable treatment improving softness, moisture absorption and transport as well as antistatic characteristics of polyester, polyester/spandex polyester/cotton and cotton fabrics and corresponding articles made from these fabrics thereof.

29 Claims, No Drawings

ADVANCED MOISTURE MANAGEMENT LAUNDRY ADDITIVE FOR PROVIDING SOFT HAND, MOISTURE TRANSPORT AND ANTISTATIC PROTECTION FOR POLYESTER, POLYESTER/SPANDEX POLYESTER/COTTON AND COTTON FABRICS

CROSS-REFERENCE TO RELATED APPLICATION

This is an application pursuant to 35 U.S.C. Section 111(a) and claims benefit of filing date of U.S. provisional application 61/143,902, filed Jan. 12, 2009 under the provision of 35 U.S.C. Section 111(b), pursuant to 35 U.S.C. Section 119(e)(1).

FIELD OF THE INVENTION

The present invention relates to a composition that, when incorporated into various steps of household and/or commercial laundering cycles provides highly durable treatment improving softness, moisture absorption and transport as well as antistatic characteristics of polyester, polyester/spandex polyester/cotton and cotton fabrics and corresponding articles made from these fabrics thereof.

BACKGROUND OF RELATED TECHNOLOGY

In many instances, applications and use of polyester, polyester/spandex polyester/cotton and cotton fibrous structures or fabrics and articles made from these fabrics thereof require improvements in softness, moisture absorption and moisture transport, as well as antistatic protection over that provided by the original fibrous structures, produced from these polyester fibers/polyester fiber blends, to support the performance demands of final products manufactured from these structures. Such products that include but not limited to various garments, bed sheets, towels, etc. are typically characterized by their softness, their ability to absorb and transport moisture and the efficient dissipation of electrostatic charges, all of which determines comfort of wear and use. These properties can be probed by any number of analytical tests (ring softness test, contact angle with water or other appropriate liquids, absorption times, vertical wicking, surface resistance/resistivity, etc.) that allow the characterization of the advanced moisture management, softness and antistatic protection of the fibrous structures/fabrics. Such techniques provide a direct indication of the degree of advanced moisture management, softness and antistatic protection of the fibrous structures/fabrics, and with increasing in moisture absorption and transport rates and quick dissipation of electrostatic charges and improved softness, directly relate to a range of end use properties in the fabric, ranging from improved wear comfort and moisture management in advanced sports apparel to improved moisture absorption, softness and bulk in bed sheets and towels. Such treated polyester, polyester/spandex polyester/cotton and cotton fabrics and corresponding articles made from these fabrics thereof have significantly enhanced utility in a wide range of applications, ranging from, but not limited to, advanced sports apparel such as golf shirts, tennis shirts, various athletic compression shirts, conventional garments, bed sheets, covers, etc., and terrycloth towels. While there has been considerable activity in this area in the past, products previously developed have not been able to efficiently provide the advanced moisture management, together with the high level of antistatic protection and softness, required by most of these applications.

Much of the early work in this area covered the use of cationic or silicone surfactants based softeners during various stages of household or commercial laundering cycles. Examples of recently patented technologies in this area include the following:

U.S. Pat. No. 7,402,555 Compositions useful as fabric softeners

U.S. Pat. No. 7,351,683 related to laundry additive sachets. The sachets comprise at least two compartments and may comprise further compartments. At least one of the compartments comprises a liquid laundry additive composition.

U.S. Pat. No. 7,196,048 relates to anti-wrinkle fabric treatment compositions comprising: a) from about 0.01% to about 20% by weight, of a cationic silicone polymer or copolymer having the formula: $[CAP]\text{-}Z_m\text{-}[CAP]$ wherein each Z unit comprises at least one secondary, tertiary, or quaternary amino moiety, or mixtures thereof; [CAP] is a backbone termination or truncation unit; m is from 1 to 50. b) from about 1% to about 30% by weight, of a scavenger effective in scavenging compounds comprising an anionic unit; and c) the balance a carrier system.

U.S. Pat. No. 7,186,680 Compositions, articles and methods are provided for supplying fabric care benefits to clothing or fabrics in an automated washing machine and by manual washing.

U.S. Pat. No. 7,166,565 Compositions, articles and methods are provided for supplying fabric care benefits to clothing or fabrics in an automated washing machine and by manual washing.

U.S. Pat. No. 7,112,621 Coating compositions, methods and articles of manufacture comprising a nanoparticle system employing same to impart surface modifying benefits for all types of soft surfaces, and in some cases, hard surfaces, are disclosed. In some embodiments, dispersement of nanoparticles in a suitable carrier medium allows for the creation of coating compositions, methods and articles of manufacture that create multi-use benefits to the modified surfaces.

U.S. Pat. No. 7,091,171 Compositions, articles and methods are provided for supplying fabric care benefits to clothing or fabrics in an automated washing machine and by manual washing.

U.S. Pat. No. 7,056,877 Compositions, articles and methods are provided for supplying fabric care benefits to clothing or fabrics in an automated washing machine and by manual washing.

Typically such prior art laundry additives are based on either silicone surfactants or cationic softeners which do not provide complex simultaneously combined functionalities of advanced moisture management, softness and antistatic protection.

SUMMARY OF THE INVENTION

The present invention relates to a composition that, when incorporated into various steps of household and/or commercial laundering cycles provides highly durable treatment improving softness, moisture absorption and transport as well as antistatic characteristics of polyester, polyester/spandex polyester/cotton and cotton fabrics and corresponding articles made from these fabrics thereof:

Water absorption measured as time to absorb 1 ml of water;
Water absorption characterized by the absorption area;

Moisture transport measured by vertical wicking;
Softness measured by ring or pliability tests;
Softness measured by hand panel tests;
Antistatic protection measured by either surface resistance/resistivity or ESD (static dissipation) tests.

Such changes in performance of above mentioned fabrics and articles thereof are highly desirable for enhancing the utility of above mentioned structures in a wide range of applications and products, ranging from advanced sports apparel to various household and commercial applications.

The present invention also provides an efficient, effective method for generating advanced moisture management performance in polyester as well as cotton fabrics, along with the corresponding articles made from these fabrics. The method is based on the addition of the product in a form of liquid additive into one of the steps of the household or commercial laundry cycles, which results in a durable treatment; providing washed articles with advanced moisture management properties, improved softness and antistatic protection.

We have found that certain classes of materials, when combined, function synergistically, resulting in enhanced advanced moisture management performance at relatively low concentrations. This is desirable in that it minimizes the effect of the laundry additive on the environment. In addition, we have determine that through the selection of specific materials, laundry additive can be designed that provided enhanced durability and maintain advanced moisture management performance of fabrics and articles thereof treated with the additive even after significant and multiple household and commercial laundering cycles carried out later on without use of the additive. These additives also work as softeners and antistats for polyester based and cotton fabrics and corresponding articles.

DETAILED DESCRIPTION OF THE INVENTION

The present invention is composed of a blend of two or more components, one of which is selected from polyester/polyoxyalkylene block copolymers.

In accordance with the present invention, we have discovered that block copolymers containing multiple polyester/polyoxyalkylene blocks provide exceptional functionality in this area. These materials are based on polymers composed of multiple blocks of polyester and polyoxyalkyene diols:

The polyester blocks are produced from the reaction of one of the following diols or polyols (ethylene glycol, propylene glycol, diethylene glycol, triethylene glycol, tetraethylene glycol, hexylene glycol, glycerin, trimethylol propane or pentaerythritol) and an organic di/poly acid or anhydride (phthalic acid/anhydride, isophthalic acid/anhydride, terephthalic acid/anhydride, trimellitic acid/anhydride, pyromellitic acid/anhydride, oxalic acid/anhydride, malonic acid/anhydride, succinic acid/anhydride, glutaric acid/anhydride, adipic acid/anhydride, maleic acid/anhydride, or fumaric acid/anhydride) in a 1:1 ratio.

The polyoxyalkylene diol blocks are produced from the polymerization of cyclic ethers (poly 1,4 butyl ethers (PTHF) from tetrahydrofuran) and a diol initiating material i.e., the reactive diol used to make the polyoxyalkylene diol block (polyethylene glycol (PEG) from ethylene oxide, polypropylene glycol (PPG) from propylene oxide, polybutylene glycol (PBG) from butylene oxide,) or random—block copolymers based on the combination of these materials. The number average molecular weight of these polyoxyalkylene diol blocks is in the range of 200 to 8,000 and "from" indicates the starting material for each polymeric material.

The polyester blocks are copolymerized with the low molecular weight diols/polyols and the polyoxyalkylene diols/polyols to yield the polyester/polyoxyalkylene block copolymers with a number average molecular weight in the range of 2,000 to 700,000.

As used herein, block copolymers have all repeated segments together, e.g., $(EO)_m$—$(PO)_n$—$(EO)_1$. In distinction, random copolymers have block mixed in the random order, e.g., EO—PO—PO—PO—EO—PO—EO.

These polymers may also contain functional terminating groups such as organic acids (fatty acids or the like) or hydroxy materials (organic alcohols, alkoxylated organic alcohols or the like). Some specific examples of these functional terminating groups are: dodecanoic acid, decanoic acid, hexanoic acid or dodecanol, decanol, hexanol. The term "functional terminating groups" refers to croups with at least one reactive site. There is a functional terminating group at both ends of the polymer, but there can be instances where a functional terminating group occurs at only one end of the polymer.

Examples of useful polyester/polyoxyalkylene block copolymers are given below:

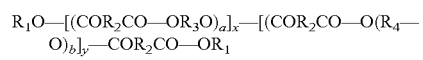

Where the functional groups are as follows:
$R_1$ is selected from the following: H, alcohol (branched and linear with carbon numbers from $C_1$ to $C_{30}$), alcohols (branched and linear $C_1$-$C_{30}$) alkoxylates (alkoxylated random or alkoxylated block copolymers), monocarboxylic acids (branched and linear with carbon number from $C_1$-$C_{20}$). Alkoxylates can be polymers and copolymers of ethylene oxide, propoleyene oxide, butylene oxide, etc.

Where —$COR_2CO$—$OR_3O$— (the first polyester block) is selected from the following: $R_2$ is from the earlier identified; $R_3$ is ethylene or propylene or 1,2 butene or 1,4 butene or a mixture of these (block or random) with a number average molecular weight range of 200 to 8,000 and a is from 2 to 50. A specific example of the first polyester block is the reaction product of adipic acid and ethylene oxide/propylene oxide copolymer.

Where —$COR_2CO$—$OR_4O$— (the second polyester block) is selected from the following: $R_2$ is from the earlier identified diacids/anhydrides; the earlier identified diacids/anhydrides; $R_4$ is ethylene or propylene or 1,2 butene or 1,4 butene or a mixture of these (block or random) with a number average molecular weight range of 200 to 8,000 and b is from 2 to 50. A specific example of the second polyester block is the reaction product of succinic acid and poly 1,4 butene oxide.

Where the polyester block makes up 10 to 50% of the number average molecular weight of the final block copolymer.

Where the final polymer has multiple blocks of polyester and polyoxyethylene and where the combination of blocks (a, b, x and y) such that the final copolymer has a number average molecular weight in the range of 2,000 to 700,000, where x and y are from 0 to 2,500, where either x or y maybe equal to 0, but both would not be equal to 0 at the same time.

These block copolymers are then formulated into water based dispersions that are the functional form for utilizing these materials in the targeted end us. These formulations may include:

Anionic surfactants selected from the group of alkylsulfate salts with the molecular formula $ROSO_3^-Z^+$, where R is an alkyl chain (branched or linear with 2-18 carbon units) and $Z^+$ is $Li^+$, $Na^+$, or $K^+$; or from the group of alkyl benzene sulfonates with the molecular formula $R-Ar-SO_3^-Z^+$, where R is an alkyl chain with 2-18 carbon units, Ar is an aromatic benzene ring, and $Z^+$ is $Li^+$, $Na^+$, or $K^+$; or from the group of alkylsulfosuccinate salts with molecular formula $R_5OOCCH_2SO_3^-CH_2COOR_6 X^+$, where $R_5$ and $R_6$ are alkyl chains from 2-18 carbon units, either linear or branched, either saturated or unsaturated, and $X^+$ is $Na^+$ or $K^+$.

Nonionic surfactants selected from the group linear or branched alcohol alkoxylates with the molecular formula $R_7CO-(CH_2CH_2O)_m(CH_2CH_3CHO)_nH$, where $R_7$ is comprised of a linear or branched alkyl chain from 4 to 18 carbon atoms, either saturated or unsaturated and m is greater than or equal to 3 and less than or equal to 30 and n is greater than or equal to 0 and less than or equal to 30.

Nonionic surfactants selected for the group alkylphenol alkoxylates with the molecular formula $R_8CO-(CH_2CH_2O)_m (CH_2CH_3CHO)_nH$, where $R_8$ is an alkylphenol composed of a phenolic ring to which is attached one or more, linear or branched, alkyl chains, from 8 carbon units to 12 carbon units in length, and m and n are as earlier defined.

Other surfactant components may be included in the composition; including various wetting agents, alkoxylated derivatives (Tergitol®, Minfoam 2x), ionic and non-ionic products (Ethoxylated hexyl phosphate potassium salt), silicone surfactants (Dow Corning FF-400®) and the like. Preferred wetting agents are the anionic surfactants which are earlier set forth.

The final compositions of the advanced moisture management laundry additive contains the block copolymer and one or more surfactant materials selected from the above 4 classes of surfactants. The block copolymer makes up 50 to 95% of the final composition (excluding water) with the balance being selected from the above 4 classes of surfactants.

The final compositions are then put into a form that is acceptable to the household and commercial laundering [concentrates (<50% final composition in water by weight based on the weight of material and water), super concentrates (>50% final composition in water by weight based on the weight of material and water), and can be supplied to consumer for incorporation into laundering cycles. The additive is then introduced during selected steps (washing, rinsing or drying) of the household or commercial laundry cycles such that there is 0.01 to 15% by weight of the composition on the resultant polyester based or cotton fabrics or corresponding articles made from these fabrics. For example, the concentrate or superconcentrate can be added directly into the water during the rinse cycle.

As an alternative, the additive in the form of concentrate or super concentrate can be added at the wash cycle along with regular detergent.

Additive can also be added during the drying cycle by application to fibrous or otherwise porous carrier substrates, i.e. nonwovens, sponges, etc.

As used herein the term polyester based or cotton fabric means a flexible artificial fibrous material formed by weaving or knitting of individual fibers or threads which are interlaid in a regular, identifiable manner as in a knitted or woven fabric.

In accordance with the present invention, there is obtained a highly efficient moisture management polyester based or cotton fabrics with improved softness and antistatic protection. In accordance with the present invention, a fabric is considered to have highly efficient moisture management properties when it has a moisture absorption times and vertical wicking rates at least 20% better compared to untreated fabric.

As will be apparent to one of skilled in the art, the present invention is well suited for the preparation of polyester based and cotton fabrics and articles thereof with advanced moisture management properties, improved softness and antistatic protection. We have developed, associated with this program, many examples, along with supporting data and all this will be present as part of the patent which we intend to pursue. Accordingly, while the present invention has been shown and described herein, it is to be understood that the foregoing description and accompanying drawings are offered by way of illustration only and not as a limitation.

The invention claimed is:

1. A composition, comprising: a blend of two or more components, wherein at least one component is selected from polyester/polyoxyalkylene block copolymers.

2. The composition according to claim 1, comprising multiple polyester/polyoxyalkylene block copolymers.

3. The composition according to claim 1, wherein the polyester of the polyester/polyoxyalkylene block copolymer is a polyester produced from the reaction of diols or polyols, and an organic diacids/anhydrides in a 1:1 ratio.

4. The composition according to claim 1, wherein the polyoxyalkylene of the polyester/polyoxyalkylene block copolymers is a polyoxyalkylene diol produced by polymerization of a cyclic ether and a diol initiating material.

5. The composition according to claim 4, wherein a number average molecular weight of the polyoxyalkylene diol ranges from 200 to 8,000.

6. The composition according to claim 1, wherein the polyester/polyoxyalkylene block copolymers have a number average molecular weight of from 2,000 to 700,000.

7. The composition according to claim 1, wherein the polyester/polyoxyalkylene block copolymers have a functional terminating group at one end of the copolymers.

8. The composition according to claim 1, wherein the polyester/polyoxyalkylene block copolymers have functional terminating groups at both ends the copolymers.

9. The composition according to claim 8, wherein polyester/polyoxyalkylene block copolymers have a structure of formula (I):

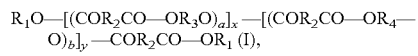

wherein, $-(COR_2CO-OR_3O)_a-$ represents a first polyester block;

$-(COR_2CO-OR_4-O)_b-$ represents a second polyester block;

$R_1$ represents a hydrogen atom, an alcohol, $C_1$-$C_{30}$ alkyl alcohol, $C_1$-$C_{30}$ alkyl alcohol alkoxylate, $C_1$-$C_{20}$ monocarboxylic acids;

$R_2$ represents a diacid/anhydride;

$R_3$ represents ethylene, propylene, 1,2-substituted butylene, or 1,4-substituted butylene;

a is a number from 2 to 50;

R₄ is ethylene, propylene, 1,2-substituted butylene, or 1,4-substituted butylene;

b is from 2 to 50; and x and y represent a number from 0 to 2,500, provided that either x or y may be equal to 0, but not both.

10. The composition according to claim 9, wherein the first polyester block has a number average molecular weight ranging from 200 to 8,000.

11. The composition according to claim 9, wherein the second polyester block has a number average molecular weight ranging from 200 to 8,000.

12. The composition according to claim 9, wherein the polyester blocks make up 10 to 50% of the number average molecular weight of a final block copolymer, which has a number average molecular weight in the range of from 2,000 to 700,000.

13. A water-based dispersion composition comprising the composition according to claim 1.

14. The water-based dispersion composition according to claim 13, further comprising one or more surfactants.

15. The water-based dispersion composition according to claim 13, having a concentration less than 50% in water by weight based on the weight of the composition and water.

16. The water-based dispersion composition according to claim 13, having a concentration greater than 50% in water by weight based on the weight of the composition and water.

17. The composition according to claim 1, wherein the block copolymers comprise 50 to 95% of the composition, excluding water, and one or more surfactant(s) is the balance of the composition.

18. A method of treating a fibrous material, comprising: contacting said fibrous material with a composition according to claim 1.

19. The method according to claim 18, wherein said fibrous material is polyester-based or cotton.

20. The method according to claim 18, wherein the composition is added to the fibrous material during laundry cycles, such that 0.01 to 15% by weight of the composition remains on the fibrous material.

21. The method according to claim 20, wherein the laundry cycles are selected from the group consisting of washing, rinsing and drying.

22. The method according to claim 21, wherein the composition is added directly to water, and wherein the laundry cycle is a rinsing cycle.

23. The method according to claim 21, wherein the composition is added directly to water, and wherein the laundry cycle is a washing cycle.

24. The method according to claim 21, wherein the composition is added directly to water, and wherein the laundry cycle is a drying cycle.

25. The method according to claim 18, wherein the composition is blended at a ratio from 5:95 to 95:5 percent by weight with at least one softener, and later is added to the fibrous material during laundry cycles, such that 0.01 to 15% by weight of the blend of the composition and softener remains on the fibrous material.

26. The method according to claim 25, wherein the laundry cycles are selected from the group consisting of washing, rinsing and drying.

27. The method according to claim 26, wherein the composition is added directly to water, and wherein the laundry cycle is a rinsing cycle.

28. The method according to claim 26, wherein the composition is added directly to water, and wherein the laundry cycle is a washing cycle.

29. The method according to claim 26, wherein the composition is added directly to water, and wherein the laundry cycle is a drying cycle.

* * * * *